UNITED STATES PATENT OFFICE 2,393,607

NORPOLYCYCLOPENTENONES

Herman A. Bruson, Philadelphia, Pa., assignor to The Resinous Products & Chemical Company, Philadelphia, Pa., a corporation of Delaware No Drawing. Application March 1, 1944, Serial No. 524,625

4 Claims. (Cl. 260—586)

This invention relates to norpolycyclopentenones, unsaturated ketones of the dihydronorpolycyclopentadiene ring system. The simplest of these, nordicyclopentenone, has the formula

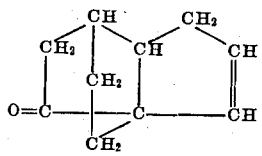

In application Serial No. 476,645, filed February 20, 1943, of which the present application is a continuation-in-part, it is shown that crystalline polycyclopentadienes having two double bonds and one to four endomethylene cycles per molecule are hydrated in the presence of sulfuric acid at the double bond of the endomethylene cycle. Simultaneously there occurs a rearrangement of this cycle to the dihydronorpolycyclopentadiene system, a cyclic arrangement discovered by the present applicant. This reaction may be represented as follows:

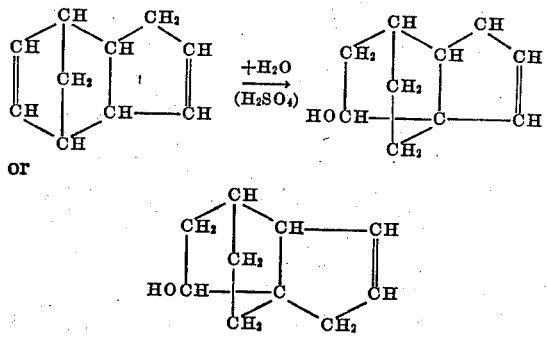

Of these two possible structures, the former is the more probable for hydroxydihydronordicyclopentadiene. The two structures differ only in the exact position of the double bond in the cyclopenteno group. This is not a critical factor in the overall properties of the compound, as evidenced by the failure of conventional methods of structure analysis to give this location.

The acid-catalyzed, addition-rearrangement product of dicyclopentadiene and water may be represented by the following formula:

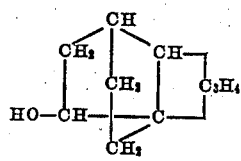

wherein $C_3H_4$ is a propenylene group which in conjunction with the adjoining carbon atoms forms a cyclopenteno group.

According to the present invention, hydroxydihydronorpolycyclopentadiene is oxidized to the corresponding ketone without scission of the double bond of the cyclopentene group. There is preferred for this purpose chromic acid as the oxidizing agent. The conversion may also be effected by passing the vapor of the alcohol with air over brass turnings. Furthermore, the ketone may be prepared by dehydrogenation, for example with powdered nickel as a catalyst.

As a hydroxydihydronorpolycyclopentadiene there may be used any of the compounds formed from the crystalline polycyclopentadienes having two double bonds and one to four endomethylene cycles per molecule by hydration and rearrangement in the presence of sulfuric acid. The alcohols thus formed are of the general formula

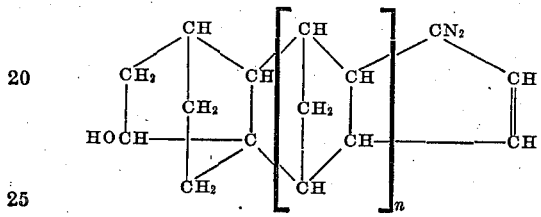

where $n$ has a value zero, one, two, or three.

While any single alcohol may be used, there may also be used mixtures, particularly mixtures of hydroxydihydronordicyclopentadiene with higher hydroxydihydronorpolycyclopentadienes.

When chromic acid is used, it and the hydroxydihydronorpolycyclopentadiene are mixed, preferably in the presence of a solvent therefor, such as acetic acid. It is desirable to prevent excessive rise in temperature by adjusting the rate of mixing and/or cooling. Reaction temperatures up to 100° C. or more may be used, depending upon the oxidizing agent utilized. The resulting ketone is then separated by conventional methods, which may include neutralization, extraction, washing, distillation, etc.

The following example illustrates the preparation of nordicyclopentenone, starting with dicyclopentadiene and proceeding through the hydrated addition-rearrangement product to the new ketone.

EXAMPLE

A mixture of 264 g. of pure dicyclopentadiene and 800 g. of aqueous 25% sulfuric acid was stirred rapidly and heated under a reflux condenser at 104°–107° C. for four and one-half hours. The aqueous sulfuric acid layer was then separated and the oil layer washed successively with hot water, sodium hydroxide solution, and finally again with hot water until free from acidity. The oil was dried and distilled in vacuo at 6 mm. absolute pressure of mercury. The product which distilled over between 105° and 115° C./6 mm. was hydroxydihydronordicyclopentadiene. It was a colorless oil. The yield was 250 g. or 83.4% of theory.

Upon redistillation it boiled at 102°–104° C./7 mm. or 240° C./773 mm. and possessed the following constants: $n_D^{25}$ 1.5246; $d_4^{25}$ 1.0773.

Oxidation of hydroxydihydronordicyclopentadiene

A solution consisting of 160 g. of chromic anhydride, 500 g. of acetic acid, and 100 g. of water was added dropwise to a stirred mixture of 300 g. of hydroxydihydronordicyclopentadiene and 500 g. of acetic acid while the reaction mixture was maintained at 40°–45° C. by cooling and by controlling the rate of addition. After all the chromic anhydride reagent had been added, the mixture was stirred several hours at room temperature and was finally heated at 95° C. for two and one-half hours. The product was diluted with water and the oil separated, washed with water and with sodium carbonate solution, dried, and distilled in vacuo. The fraction boiling at 126–133° C./29 mm. was nordicyclopentenone. The yield was 190 g. From the aqueous layer more of the ketone can be extracted by means of toluene.

The pure ketone regenerated from its semicarbazone by steam distillation in the presence of oxalic acid is a colorless thin oil boiling at 109° C./13 mm. and has a faint odor characteristic of cyclopentanone. The density, $d_4^{25}$, is 1.0759 and $n_D^{25}$ is 1.5146. It forms an oxime melting at 106° C. and a semicarbazone melting at 200° C.

Reduction of the double bond gives nordicyclopentanone, a liquid at ordinary temperatures,

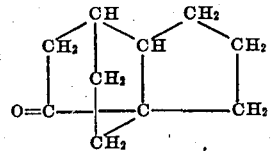

which forms a semicarbazone melting at 212° C.

Reduction of both the double bond and carbonyl group gives hydroxytetrahydronordicyclopentadiene, a solid alcohol, melting at 53° C. Complete reduction, as by the Clemmensen method, gives tetrahydronordicyclopentadiene, a hydrocarbon boiling at 83°–84° C. at 28 mm. pressure having values for $n_D^{25}$ of 1.4868 and for $d_4^{25}$ of 0.9314, and having the structure

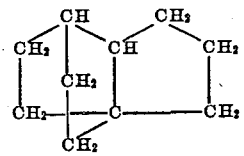

In place of dicyclopentadiene as a starting material, any other crystalline polycyclopentadiene may be used or mixtures of the non-resinous polycyclopentadienes to yield the hydroxydihydronorpolycyclopentadienes described in application Serial No. 476,645, filed February 20, 1943; and these may then be converted to the new ketones by the procedure described in detail above.

The new ketones of this invention are useful for the preparation of pharmaceuticals, insecticides, and plastics. They are also useful as solvents and as plasticizers.

I claim:

1. As new compounds, non-resinous norpolycyclopentenones, having as one terminal cycle an endoethylene cyclopentano ring containing a carbonyl group and as the opposite terminal cycle a cyclopenteno ring, said compounds being the ketones corresponding to the hydroxydihydronorpolycyclopentadienes formed by the sulfuric acid-catalyzed, addition-rearrangement reaction of water and polycyclopentadienes having two double bonds and one to four endomethylene cycles per molecule.

2. As a new compound, a non-resinous nordicyclopentenone, having as one terminal cycle an endoethylene cyclopentano ring containing a carbonyl group and as the opposite terminal cycle a cyclopenteno ring, said compound being the ketone corresponding to hydroxydihydronordicyclopentadiene obtained by the sulfuric acid-catalyzed, addition-rearrangement reaction between water and dicyclopentadiene.

3. A method for preparing norpolycyclopentenones, having as one terminal cycle an endoethylene cyclopentano ring containing a carbonyl group and as the opposite terminal cycle a cyclopenteno ring, which comprises oxidizing by means of chromic acid the alcoholic hydroxyl group of hydroxydihydronorpolycyclopentadienes obtained as the hydration-rearrangement reaction of crystalline polycyclopentadienes having two double bonds and one to four endomethylene cycles per molecule and water in the presence of sulfuric acid.

4. A method for preparing nordicyclopentenone which comprises oxidizing by means of chromic acid the alcoholic hydroxyl group of the secondary alcohol, hydroxydihydronordicyclopentadiene, obtained by the hydration-rearrangement reaction of dicyclopentadiene and water in the presence of sulfuric acid.

HERMAN A. BRUSON.